United States Patent
Kwon et al.

(10) Patent No.: US 7,512,153 B2
(45) Date of Patent: Mar. 31, 2009

(54) APPARATUS AND METHOD FOR CONTROLLING A REVERSE TRAFFIC RATE IN A MOBILE COMMUNICATION SYSTEM

(75) Inventors: Hwan-Joon Kwon, Gyeonggi-do (KR); Youn-Sun Kim, Seongnam-si (KR); Dong-Hee Kim, Seoul (KR); Chang-Hoi Koo, Seongnam-si (KR); Dae-Gyun Kim, Seongnam-si (KR); Jung-Soo Jung, Seoul (KR); Beom-Sik Bae, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 864 days.

(21) Appl. No.: 10/842,332

(22) Filed: May 10, 2004

(65) Prior Publication Data

US 2004/0223474 A1 Nov. 11, 2004

(30) Foreign Application Priority Data

May 10, 2003 (KR) .................. P10-2003-0029651
Sep. 1, 2003 (KR) .................. P10-2003-0060947

(51) Int. Cl.
*H04J 3/22* (2006.01)
(52) U.S. Cl. ..................................... 370/468
(58) Field of Classification Search ................ None
See application file for complete search history.

(56) References Cited

U.S. PATENT DOCUMENTS

| | | | | |
|---|---|---|---|---|
| 6,782,269 B2 * | 8/2004 | Toskala et al. | ............. | 370/442 |
| 7,054,275 B2 * | 5/2006 | Kim et al. | ............. | 370/252 |
| 7,099,629 B1 * | 8/2006 | Bender | ............. | 370/342 |
| 7,283,482 B2 * | 10/2007 | Koo et al. | ............. | 370/252 |
| 7,317,711 B2 * | 1/2008 | Bae et al. | ............. | 370/335 |
| 7,324,484 B2 * | 1/2008 | Bae et al. | ............. | 370/335 |
| 2002/0151310 A1 * | 10/2002 | Chung et al. | ............. | 455/452 |
| 2002/0181410 A1 * | 12/2002 | Bae et al. | ............. | 370/252 |
| 2003/0060203 A1 * | 3/2003 | Ahn | ............. | 455/445 |
| 2003/0093364 A1 * | 5/2003 | Bae et al. | ............. | 705/37 |

(Continued)

FOREIGN PATENT DOCUMENTS

EP 1 248 417 10/2002

(Continued)

OTHER PUBLICATIONS

Young-uk Chung et al., "A Novel Transmission Procedure for Throughput Maximization in 1xEV-DV Reverse Link", 2002 IEEE, pp. 497-501.

(Continued)

*Primary Examiner*—Anh-Vu H Ly
(74) *Attorney, Agent, or Firm*—The Farrell Law Firm, PC

(57) ABSTRACT

A system and method for controlling data rates of a reverse packet data in mobile communication system for transmitting reverse packet data from a mobile station to a base station over a reverse packet data channel at a plurality of data rates. The present invention provides an apparatus and method for improving throughput of an entire system by enabling a base station's scheduler to rapidly assign reverse resource for a mobile station that has completed its data transmission to other mobile stations.

27 Claims, 12 Drawing Sheets

U.S. PATENT DOCUMENTS

| | | | |
|---|---|---|---|
| 2003/0219037 A1* | 11/2003 | Toskala et al. | 370/496 |
| 2004/0146016 A1* | 7/2004 | Kim et al. | 370/328 |
| 2004/0174846 A1* | 9/2004 | Kwon et al. | 370/328 |
| 2004/0218559 A1* | 11/2004 | Kim et al. | 370/318 |
| 2007/0286128 A1* | 12/2007 | Bae et al. | 370/335 |

FOREIGN PATENT DOCUMENTS

| | | |
|---|---|---|
| WO | WO 00/14900 | 3/2000 |
| WO | WO 02/37890 | 5/2002 |
| WO | WO 02/063781 | 8/2002 |
| WO | WO 03/028251 | 4/2003 |

OTHER PUBLICATIONS

Vincent K. N. Lau et al., "On Generalized Optimal Scheduling of High Data-Rate Bursts in CDMA Systems", IEEE Transactions on Communications, vol. 51, No. 2, Feb. 2003, pp. 261-266.

* cited by examiner

APPARATUS AND METHOD FOR CONTROLLING A REVERSE TRAFFIC RATE IN A MOBILE COMMUNICATION SYSTEM

PRIORITY

This application claims priority under 35 U.S.C. § 119 to an application entitled "Apparatus and Method for Controlling Reverse Traffic Rate in a Mobile Communication System" filed in the Korean Intellectual Property Office on May 10, 2003 and assigned Ser. No. 2003-29651, and an application entitled "Apparatus and Method for Controlling Reverse Traffic Rate in a Mobile Communication System" filed in the Korean Intellectual Property Office on Sep. 1, 2003 and assigned Ser. No. 2003-60947, the contents of both of which are incorporated herein by reference.

BACKGROUND OF THE INVENTION

1. Field of the Invention

The present invention relates generally to an apparatus and method for controlling a traffic rate in a mobile communication system, and in particular, to an apparatus and method for controlling a reverse traffic rate in a mobile communication system.

2. Description of the Related Art

Commonly, a mobile communication system utilizing Code Division Multiple Access (CDMA) supports a multimedia service using the same frequency band. In the CDMA mobile communication system, a plurality of users can simultaneously transmit data, and the users are identified using unique codes assigned thereto.

In the system, reverse data is transmitted over a packet data channel on a physical layer packet (PLP)-by-PLP basis. In this case, a packet length is fixed, but a data rate is variable for each packet. Therefore, information on a mobile station, such as power and the amount of transmission data of the mobile station, is fed back to a base station. Based on the feedback information, the base station controls a rate of transmission packet data by scheduling.

A process of determining a data rate of a mobile station, which varies for each packet, in the manner described above is called "scheduling," and the scheduling is performed by a scheduler of a base station. The scheduler of a base station performs scheduling based on a Rise of Thermal (RoT) indicating 'thermal noise-to-total reception power' or a load obtained from RoT of a mobile station belonging to a base transceiver station (BTS). A scheme in which a base station controls a reverse rate of a mobile station includes a Limited Rate Transition scheme. In the Limited Rate Transition scheme, a base station limits a transition of a data rate to one step.

A description of a general Rate Transition scheme will be made under the assumption that a possible set or table of data rates includes 9.6 Kbps, 19.2 Kbps, 38.4 Kbps, 76.8 Kbps, 153.6 Kbps, and 307.2 Kbps in order. In addition, it is assumed that a rate of packet data that is transmitted in a reverse direction by a mobile station at a particular time is 38.4 Kbps. The data rate set or table is subject to change in number and values of data rates included therein according to different systems. The Rate Transition scheme can be classified into a Full Rate Transition scheme and a Limited Rate Transition scheme.

In the Full Rate Transition scheme, a base station can set all the data rates for a next packet of a mobile station. That is, in a system using the Full Rate Transition scheme, a mobile station can change its current data rate of 9.6 Kbps to 307.2 Kbps at once. Therefore, a reverse rate of a mobile station, which can be allowed by a base station, is not limited from a previous rate of the mobile station. However, in the Limited Rate Transition scheme, a base station limits a transition of a data rate to one step in determining a data rate of a next packet of a mobile station. For example, the base station restrictively sets a rate of the next packet to one of 38.4 Kbps, 76.8 Kbps, and 153.6 Kbps for a mobile station that currently transmits data at 76.8 Kbps. In other words, the base station enables the mobile station to increase or decrease its current data rate of 76.8 Kbps by one step, or hold the current data rate. Accordingly, the transition of a data rate of a mobile station is limited.

The Limited Rate Transition scheme is disadvantageous in that a base station restrictively changes a data rate of a mobile station by one step. However, the Limited Rate Transition scheme is advantageous in that the scheduling result can be transmitted with a single bit, thereby contributing to minimization of overhead. In addition, the Limited Rate Transition scheme shows a relatively small variation in interference to other cells by limiting the transition of a data rate of a mobile station to one step.

A description will now be made of operations of a base station and a mobile station, information transmission, and channels for the information transmission in the current Limited Rate Transition scheme.

When RoT is available, a scheduler in a base station performs scheduling such that the RoT should be set to a reference RoT level. However, when RoT is not available, the scheduler performs scheduling such that the RoT should be set to a reference load level. Based on the scheduling result, the base station transmits a rate control bit (RCB) to a mobile station. The RCB is transmitted to a particular mobile station over a forward rate control channel (F-RCCH). The names of a specific control bit and a specific channel used herein are given for the convenience of explanation, by way of example.

A mobile station increase a data rate in a next transmission period by one step if an RCB value received from a base station is (+1) (Up), and decreases the data rate in the next transmission period by one step if the RCB value is (−) (Down). In addition, if the received RCB value is '0' (Maintain, or Hold), the mobile station maintains a data rate of a previous transmission period.

FIG. 1 is a timing diagram illustrating a procedure for controlling a data rate of a mobile station using a Limited Rate Transition scheme according to the prior art. In FIG. 1, an RCB is transmitted from a base station to a mobile station over F-RCCH 101 for each transmission period. The RCB, as described above, is used by a base station to control reverse rates of mobile stations. A reverse link in FIG. 1 includes a reverse packet data control channel (R-PDCCH) 104, a reverse packet data channel (R-PDCH) 105, and a reverse pilot channel (R-PICH) 106. The R-PDCCH 104 is a control channel, which is transmitted together with the R-PDCH 105, and transmits a rate indication sequence (RIS) for relating a rate of data transmitted over the R-PDCH and a mobile status sequence (MSS) for relating power and buffer status of a mobile station. It should be noted herein that the types of information sequences and the number of the information bits, which are transmitted over the R-PDCCH 104, are changeable according to systems. Table 1 below shows an RIS field of R-PDCCH and R-PDCH data rates assigned thereto.

TABLE 1

| RIS in R-PDCCH | R-PDCCH Data Rate |
|---|---|
| 0000 | 0 Kbps |
| 0001 | 9.6 Kbps |
| 0010 | 19.2 Kbps |
| 0011 | 38.4 Kbps |
| 0100 | 76.8 Kbps |
| 0101 | 153.6 Kbps |
| 0110 | 230.4 Kbps |
| 0111 | 307.2A Kbps |
| 1000 | 307.2B Kbps |
| 1001 | 460.8 Kbps |
| 1010 | 614.4 Kbps |
| 1011 | 768.2 Kbps |
| 1100 | 921.6 Kbps |
| 1101 | 1.024 Mbps |

As shown in Table 1, if a value of the RIS field is '0001' (RIS=0001), the R-PDCH is transmitted at 9.6 Kbps. Other sequences are also interpreted in the same manner. In addition, it should be noted that value of the rates shown in Table 1 are subject to change according to different systems.

The MSS contains status information of a mobile station, and the status information is transmitted from the mobile station to a base station. More specifically, the mobile station generates an MSS relating whether the mobile station desires to increase, maintain, or decrease a data rate in the next transmission period, taking the amount of data stored in its buffer and current transmission power thereof into consideration. Thereafter, the mobile station reports the generated MSS to the base station. Here, it should be noted that the mobile station cannot immediately determine its data rate based on the MSS report, but the data rate should be allowed by a scheduler in the base station. A detailed description thereof will be given below. Table 2 below shows an example of the MSS.

TABLE 2

| MSS | Meaning |
|---|---|
| 00 | Rate Up requested by MS |
| 01 | Rate Down Notified by MS |
| 10 | Rate Maintain Requested by MS |
| 11 | Unused |

As shown in Table 2, if a value of MSS is '00' (MSS=00), a mobile station (MS) must increase a data rate in a next transmission period from a data rate in a current transmission period by one step. If a value of MSS is '01' (MSS=01), the mobile station intends to decrease the data rate in the next transmission period from the data rate in the current transmission period by one step. Here, it should be noted that the mobile station sends a notification rather than a request when decreasing its data rate. Even though the mobile station decreases its data rate without a base station's approval, the system is not affected. Further, if a value of MSS is '10' (MSS=10), the mobile station maintains the same data rate in the next transmission period. A definition of MSS=11 is not given.

Now, referring to FIG. 1, a detailed description will be made of a scheme for controlling a rate of a mobile station according to the prior art.

In FIG. 1, data to be transmitted to a base station arrives at a buffer of a mobile station at a time 107. The mobile station starts transmitting the data stored in the buffer at an initial data rate of 9.6 Kbps from a time 108. In FIG. 1, for the initial data rate of 9.6 Kbps, the system permits all mobile stations to transmit data without a base station's approval. It is assumed that transmission power of the mobile station at the time 108 is sufficiently lower than a maximum transmission power limit of the mobile station. At the time 108, the mobile station transmits 9.6-Kbps data over R-PDCH and simultaneously transmits RIS and MSS over R-PDCCH. Because a data rate of R-PDCH is 9.6 Kbps, RIS corresponding thereto becomes '0001' as shown in Table 1. In addition, because the mobile station can transmit data at a data rate higher than 9.6 Kbps, the MSS becomes '00'.

Upon receiving the R-PDCH and the R-PDCCH transmitted for one frame at the time 108, the base station performs a scheduling process. In the scheduling process, the base station analyzes MSS=00 received from the mobile station, determines that the mobile station requests to increase its data rate as a result of the analysis, and determines whether it can increase the data rate of the mobile station, considering the reverse signals (i.e., total RoT or reverse load) received from the other mobile stations.

The base station allows the mobile station to increase the data rate as a result of the scheduling, and then generates an RCB according thereto. At a time 102, the base station transmits the generated RCB, thereby indicating 'Rate Up' to the mobile station over F-RCCH. At a time 109, the mobile station receives the RCB over F-RCCH and increases its data rate to 19.2 Kbps by one step based on the received RCB. As shown in Table 1, the data rate 19.2 Kbps is higher than the data rate 9.6 Kbps by one step. At the time 109, RIS in R-PDCCH transmitted together with R-PDCH becomes '0010'. The base station and the mobile station repeat a series of processes until the mobile station completely transmits the data stored in its buffer.

Through the processes described above, the mobile station can increase its data rate an a one-step (or step-by-step) basis, based on the amount of data stored in its buffer, a ratio of the maximum transmission power limit to current transmission power of the mobile station, and distribution of the total reverse resources by the base station. After transmitting all the data, the mobile station stops data transmission. When data transmission by the mobile station is suspended, R-PDCCH transmits RIS of '0000'.

The conventional power control method, as described above, has the following problems.

Although the mobile station can increase/decrease its data rate under a control of the base station, a level of the increment/decrement is limited to one step. This means that it takes quite a long time for the mobile station to reach a high data rate. Therefore, even when a transmission environment is excellent and the amount of data stored in the buffer of the mobile station is large enough, it will still take quite a long time for the mobile station to reach an appropriately high data rate. That is, even when the mobile station stores a sufficiently large amount of transmission data in its buffer and can transmit reverse data at a high data rate and a reverse load is not so high, it takes quite a long time to satisfy a desired high data rate, thereby resulting in a reduction in reverse data throughput of the mobile station and reverse throughput of the entire system.

In the process of controlling a reverse data rate of a mobile station, when the mobile station has no more transmission data, while transmitting data at a high rate, the mobile station abruptly suspends data transmission and then transmits information relating that the data rate is '0', over the R-PDCCH. Therefore, the base station expects the mobile station to continuously receive data, until it receives RIS of '0000' over R-PDCCH from the mobile station. As a result, the base station cannot assign reverse resource for the mobile station to other mobile stations. Accordingly, an unnecessary reverse load of the mobile communication system is previously assigned to a specific mobile station, thereby resulting in a waste of reverse resources and a reduction in reverse throughput.

SUMMARY OF THE INVENTION

It is, therefore, an object of the present invention to provide an apparatus and method for increasing throughput of a mobile station and an entire system.

It is another object of the present invention to provide an apparatus and method for improving reverse throughput of a mobile station and an entire system by increasing a data rate by at least two steps in a mobile station that transmits data at an initial data rate.

It is further another object of the present invention to provide an apparatus and method for improving throughput of an entire system by enabling a base station's scheduler to rapidly assign reverse resource for a mobile station that has completed its data transmission to other mobile stations.

In accordance with one aspect of the present invention, in a mobile communication system for transmitting reverse packet data from a mobile station to a base station over a reverse packet data channel at a plurality of data rates, there is provided a method for controlling the data rates of the reverse packet data by the mobile station. The method comprises the steps of: receiving scheduled data rate information and identifier information of the mobile station from the base station over a first channel, and receiving step-by-step data rate information relating a change in a data rate from a data rate of a previous reverse packet data channel, from the base station over a second channel; if the identifier information is identical to identifier information assigned to the mobile station, transmitting reverse packet data at the scheduled data rate received over the first channel; and if the identifier information is not identical to identifier information assigned to the mobile station, transmitting reverse packet data at a data rate determined based on the step-by-step data rate information received over the second channel.

In accordance with another aspect of the present invention, in a mobile communication system for transmitting reverse packet data over a reverse packet data channel at one of a plurality of data rates, there is provided an apparatus for controlling by a base station the data rates of the reverse packet data channel of a mobile station. The apparatus comprises: a scheduler for, receiving status information of a mobile station from the mobile station, determining a reverse data rate assignable to the mobile station using the status information of the mobile station and channel information assignable to a reverse link; and a channel transmitter for transmitting information on the reverse data rate determined by the scheduler and identifier information of the mobile station, to the mobile station over a predetermined channel.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness. In addition, the terms used herein are defined according to the functions they perform, and are subject to change according to designer's intentions and usual practices. Therefore, the definition should be given based on the contents of the application. However, the new technology for efficiently measuring a received signal to interference ratio can also be applied to other mobile communication systems having similar technical background and channel type without departing from the spirit and scope of the invention as defined by the appended claims.

First Embodiment

Figure 2:
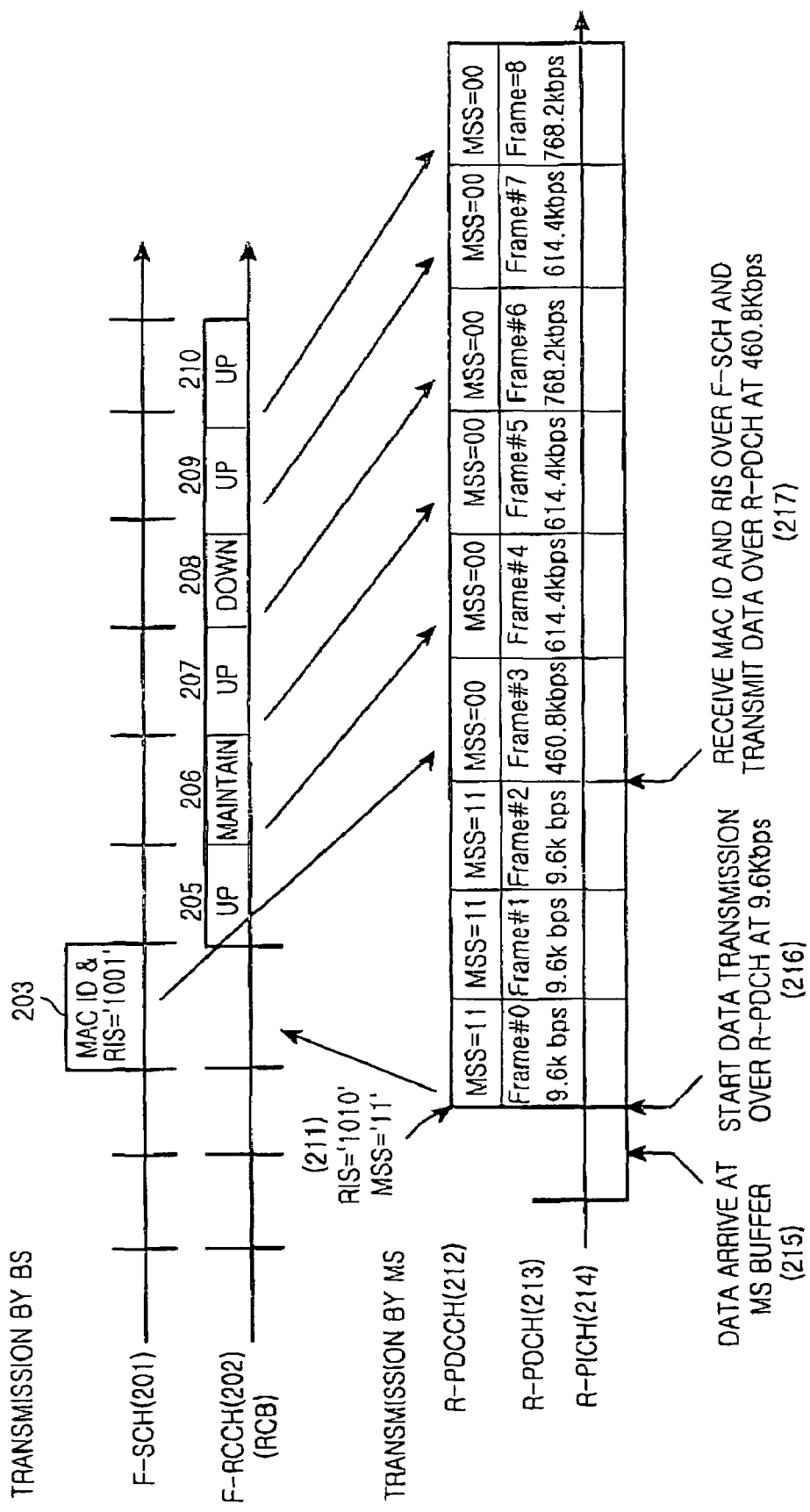
FIG. 2 is a timing diagram illustrating a procedure for controlling a data rate of a mobile station according to an embodiment of the present invention.

FIG. 2 is a timing diagram illustrating a procedure for controlling a data rate of a mobile station according to an embodiment of the present invention. Referring to FIG. 2, two forward channels transmitted from a base station to a mobile station are illustrated. One of the two forward channels is a forward scheduling channel (F-SCH) 201 and the other channel is a forward rate control channel (F-RCCH) 202. Further, three reverse channels transmitted from a mobile station to a base station are illustrated in FIG. 2. The three reverse channels include an R-PDCCH 212, an R-PDCH 213, and a reverse pilot channel (R-PICH) 214. Although other channels can be used as the forward and reverse channels, a description thereof will be omitted for simplicity. Further, the names of the channels illustrated in FIG. 2 are subject to change according to systems to which the channels are applied.

Figure 1:
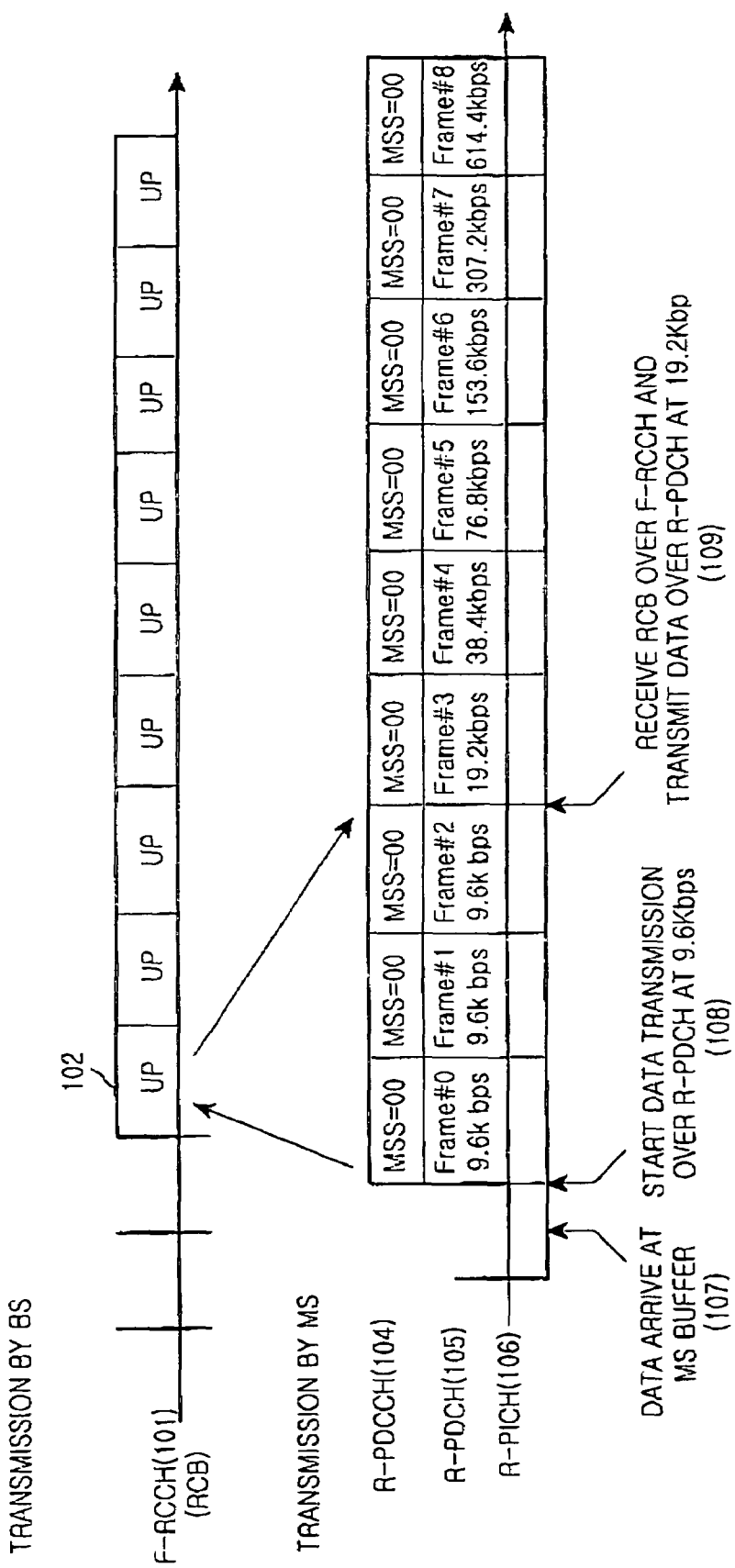
FIG. 1 is a timing diagram illustrating a procedure for controlling a data rate of a mobile station using a Limited Rate Transition scheme according to the prior art.

Compared with the timing diagram of FIG. 1, the timing diagram of FIG. 2 further includes the F-SCH 201. The F-SCH 201 indicates a reverse data rate of a mobile station, and a detailed description of its use and operation will be given herein below. When transmission data is input to its buffer, a mobile station transmits an MSS and an RIS relating a status of the mobile station to a base station over R-PDCCH 212. The base station receiving the MSS and RIS determines a data rate of the mobile station based on the received MSS and RIS. The base station transmits the RIS and/or RCB to the mobile station over the F-SCH 201 and F-RCCH 202, respectively.

In FIG. 2 corresponding to a first embodiment of the present invention, function and meaning of an MSS transmitted over an R-PDCCH 202 is changed. Table 3 below shows an example of an MSS according to an embodiment of the present invention.

TABLE 3

| MSS | Meaning |
| --- | --- |
| 00 | Rate Up requested by MS |
| 01 | Rate Down notified by MS |
| 10 | No data in buffer of MS |
| 11 | R-PDCH is transmitted at 9.6 Kbps, and a value of an RIS field in R-PDCCH indicates a maximum data rate available for MS at current time. |

As shown in Table 3, MSS=00 and MSS=01 are equal in meaning to those shown in Table 2. However, MSS=10 indicates that there is no transmission data in a buffer of the mobile station. Operations of the mobile station and the base station for MSS=10 will be described below.

According to an embodiment of the present invention, MSS=11 has two meanings. First, it means that a rate of data currently transmitted over R-PDCH 213 is an initial rate of 9.6 Kbps. Second, it means that a value of an RIS field in R-PDCCH 212 indicates a maximum data rate currently available for the mobile station, unlike in the conventional method where the value of an RIS field in R-PDCCH indicates a current data rate of R-PDCH. Such a change in meaning of the MSS will be described in more detail herein below.

The F-SCH 201 is a channel transmitted from a base station to a mobile station. Information transmitted over the F-SCH 201 includes a medium access control identifier (MAC ID) and an RIS having scheduled data rate information for a mobile station. Here, the MAC ID refers to an identifier of a mobile station. That is, the MAC ID is used for distinguishing mobile stations that perform reverse transmission to the base station. A mobile station desiring to perform reverse transmission receives the MAC ID information from the base station in an initial environment setup or call setup process. The scheduled data rate information for a mobile station is transmitted in the method shown in Table 1.

Use of the F-SCH 201 can be roughly divided into two uses. First, the F-SCH 201 can be used for controlling a rate of each mobile station when the rate is controlled using only the F-SCH 201. Also, the F-SCH 201 can be used for rapid transition of the data rate even when the Limited Rate Transition scheme is used as in the present invention.

Use of the Limited Rate Transition scheme is divided into two uses. First, the Limited Rate Transition scheme is used for rapidly increasing a data rate. Second, the Limited Rate Transition scheme is used for rapidly decreasing a data rate. A brief description will now be made of the Limited Rate Transition scheme used for the present invention.

In the present invention, the R-SCH is used as a channel for transmitting a scheduling result on a mobile station when the mobile station transmits MSS of '11'. In this case, therefore, the mobile station that transmitted MSS of '11' together with the RIS including its possible maximum rate information continues to monitor the F-SCH 201. If the MAC ID and scheduled RIS of the mobile station are received over F-SCH 201, the mobile station changes its data rate according to a data rate corresponding to the RIS field. In this case, if the base station instructs the mobile station to increase the reverse data rate by two or more steps, the mobile station transmits reverse data at the increased data rate over the R-PDCH 213.

However, the F-SCH 201 can also be used even when the base station intends to decrease a data rate of a particular mobile station by two or more steps. Therefore, a mobile station that is transmitting reverse data must decrease its data rate below a data rate indicated by data rate information in F-SCH 201, if its own MAC ID is detected while monitoring the F-SCH 201.

With reference to FIG. 2, a description will now be made of rate control operations of a mobile station and a base station according to the first embodiment of the present invention. It will be assumed in FIG. 2 that during reverse transmission, a mobile station can transmit reverse data at a rate of 9.6 Kbps without a base station's approval.

In FIG. 2, reverse transmission data arrives at a buffer of a mobile station at a time 215. That is, the reverse transmission data is stored in the buffer of the mobile station. Then the mobile station starts data transmission from a next transmission unit boundary nearest to the time 215, because it can transmit reverse data at a rate of 9.6 Kbps. The mobile station starts reverse transmission at a rate of 9.6 Kbps at a time 216. Here, it is assumed that the amount of data arrived at the buffer of the mobile station at the time 215 is sufficiently large and transmission power of the mobile station at the time where data transmission is started at the rate of 9.6 Kbps is sufficiently lower than the maximum transmission power limit of the mobile station. Then, at the time 216, the mobile station transmits 9.6-Kbps data over R-PDCH 213, at the same time, transmits RIS over R-PDCCH 212 so that a possible maximum rate of the mobile station is included in the RIS, and sets an MSS field to '11' before transmission.

As described above, when a value of the MSS field in R-PDCCH 212 is '11', a rate of data transmitted over R-PDCH 213 is 9.6 Kbps, and a value of an RIS field in the R-PDCCH 212 indicates a possible maximum rate of the mobile station at the current time of the R-PDCH 213. The possible maximum rate is determined based on the amount of data in the buffer of the mobile station and a transmission power margin of the mobile station at the corresponding time.

Therefore, a data rate of the mobile station at the time 216, where Frame#0 is transmitted, is 9.6 Kbps. Here, it is assumed that the RIS field value indicating the possible maximum rate of the mobile station is 614.4 Kbps. In this case, the RIS field value and the MSS field value of the R-PDCCH become RIS=1010 and MSS=11, respectively, as denoted by reference numeral 211. That is, the RIS value becomes '1010' indicating 614.4 Kbps, and the MSS value becomes '11'. As a result, the mobile station transmits R-PDCCH 212 along with R-PDCH 213 at Frame#0, and the R-PDCCH 212 transmits MSS=11 and RIS=1010.

A scheduler of the base station receiving the R-PDCCH 212 that was transmitted in the reverse direction for the period of Frame#0 analyzes RIS and MSS of the corresponding mobile station. Further, the scheduler determines which data rate it will assign to the corresponding mobile station, taking RoT or a reverse load of the base station into consideration. If the data rate for the mobile station determined by the scheduler is 19.2 Kbps, i.e., one step higher than 9.6 Kbps, then the base station transmits an RCB to the mobile station over F-RCCH 202. The RCB can include information instructing the mobile station to increase its data rate by one step or maintain (or hold) its data rate at the next frame.

However, if the data rate for the mobile station determined by the scheduler is higher than 19.2 Kbps, the base station transmits information indicating a particular data rate to the mobile station over the F-SCH 201. As described above, information transmitted over the F-SCH 201 includes a MAC ID and an RIS. For example, in FIG. 2, the scheduling result indicates a data rate of 460.8 Kbps. Therefore, an RIS field value of the F-SCH 201 transmitted by the base station becomes '1001', as denoted by reference numeral 203.

The mobile station receiving the F-SCH 201 denoted by the reference numeral 203 first analyzes a MAC ID field included therein. If the MAC ID field value is identical to a unique MAC ID assigned to the mobile station, the mobile station determines that an RIS field value of the F-SCH 201 corresponds to a data rate assigned thereto. Therefore, the mobile station transmits data at 460.8 Kbps over R-PDCH from a time 217.

In FIG. 2, an arrow where information indicated by the reference numeral 203 is transmitted means that the information is actually applied at the corresponding time. That is, the arrow identifies that information on the F-SCH 201 is received before the corresponding time, instead of being received at the corresponding time, and a data rate is determined at a time indicated by the arrow.

After determining the data rate as described above, the mobile station sets an RIS field value of R-PDCCH 212 to '1001' indicating 406.8 Kbps set by the base station, and an MSS field is set to any one of '00', '01' and '10' according to a data rate requested by the mobile station. The succeeding operations of the mobile station and the base station follow the Limited Rate Control operation. That is, the base station transmits an RCB over F-RCCH 202 in order to control a data rate of the mobile station on a one-step (or step-by-step) basis. Accordingly, the mobile station receives the RCB over the F-RCCH 202 and repeats an operation of increasing/decreasing its data rate by one step or maintaining its data rate according to the RCB.

As described above, a data rate of the mobile station can jump up several steps from 9.6 Kbps at once. Therefore, compared with the conventional rate control method where a data rate is increased on a one-step basis, the new rate control method is advantageous in that a time required for reaching a desired high data rate is reduced, thereby contributing to improvement in throughput of the mobile station and throughput of the entire system. In addition, the present invention is characterized in that a data rate of the mobile station can be jumped up without requiring control information other than the packet data control information used in the conventional rate control method, thereby preventing a waste of system resource.

Figure 3:
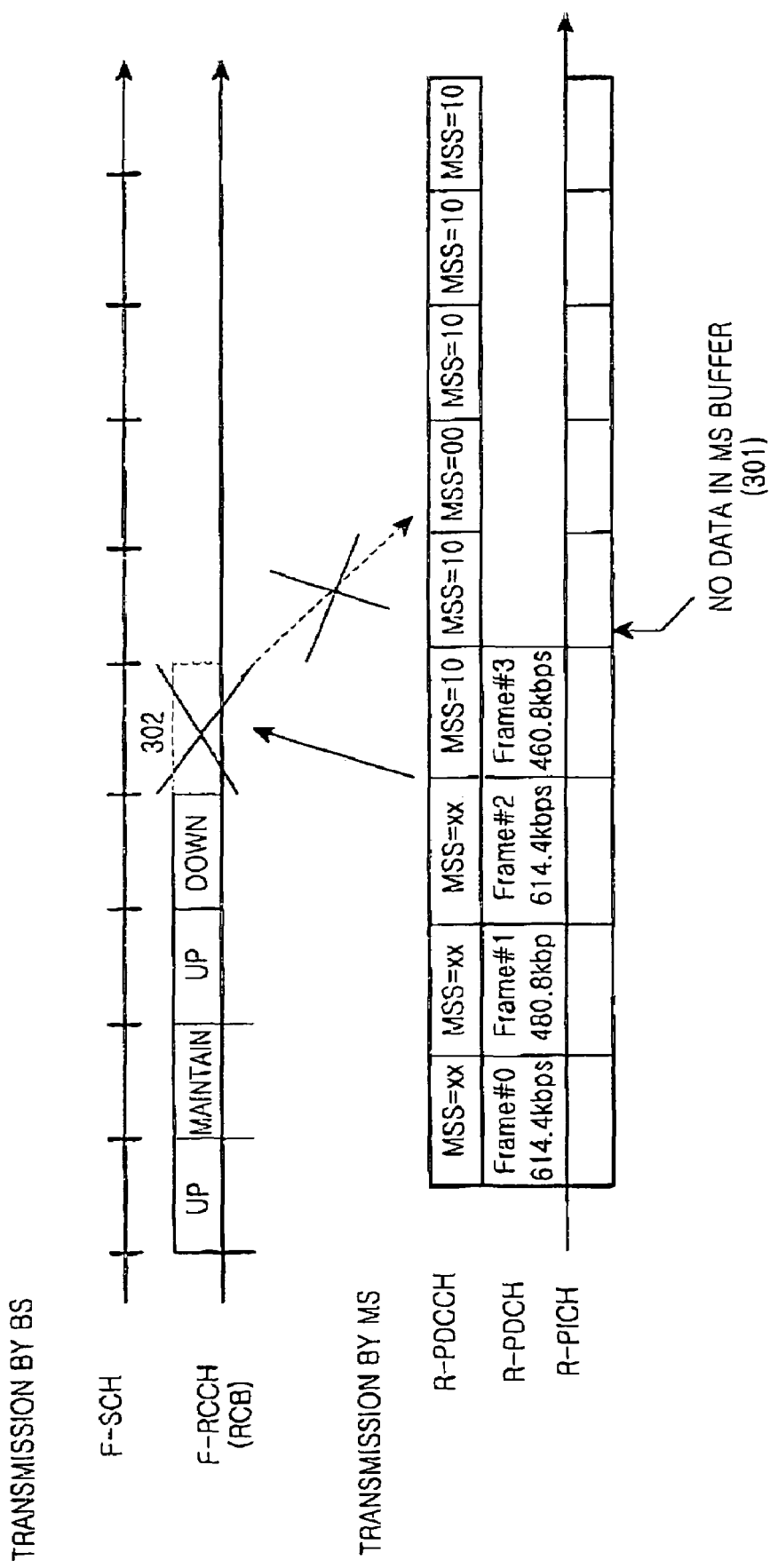
FIG. 3 is a timing diagram illustrating a "quick stop" operation according to a first embodiment of the present invention.

FIG. 3 is a timing diagram illustrating a "quick stop" operation according to the first embodiment of the present invention. Operations of a mobile station and a base station before a time 301 of FIG. 3 are identical to the corresponding operations described in conjunction with FIG. 2. However, after transmitting Frame#60 at the time 301, if there is no more transmission data in its buffer, a mobile station includes the corresponding information in R-PDCCH and transmits the R-PDCCH in the reverse direction, while transmitting data over the F-PDCH at 460.8 Kbps at the Frame#60. That is, the mobile station generates an R-PDCCH including an MSS indicating an absence of reverse transmission data and an RIS indicating its current data rate, and transmits the generated R-PDCCH in the reverse direction. The RIS field value of R-PDCCH is set to '1001', indicating the data rate of 460.8 Kbps shown in Table 1, and the MSS field value of R-PDCCH is set to '10', before being transmitted, to previously inform the base station of the presence of data in the buffer of the mobile station.

Upon receiving the R-PDCH of Frame#60 together with the R-PDCCH, the base station determines that the mobile station has no more transmission data in view of MSS=10. Therefore, the base station no longer considers the mobile station in the scheduling process. In short, the mobile station previously informs the base station that MSS is set to '10', i.e., there is no more transmission data in its buffer, and then the base station can assign the available reverse resource to another mobile station, thereby contributing improvement in throughput of the entire system.

Figure 4:
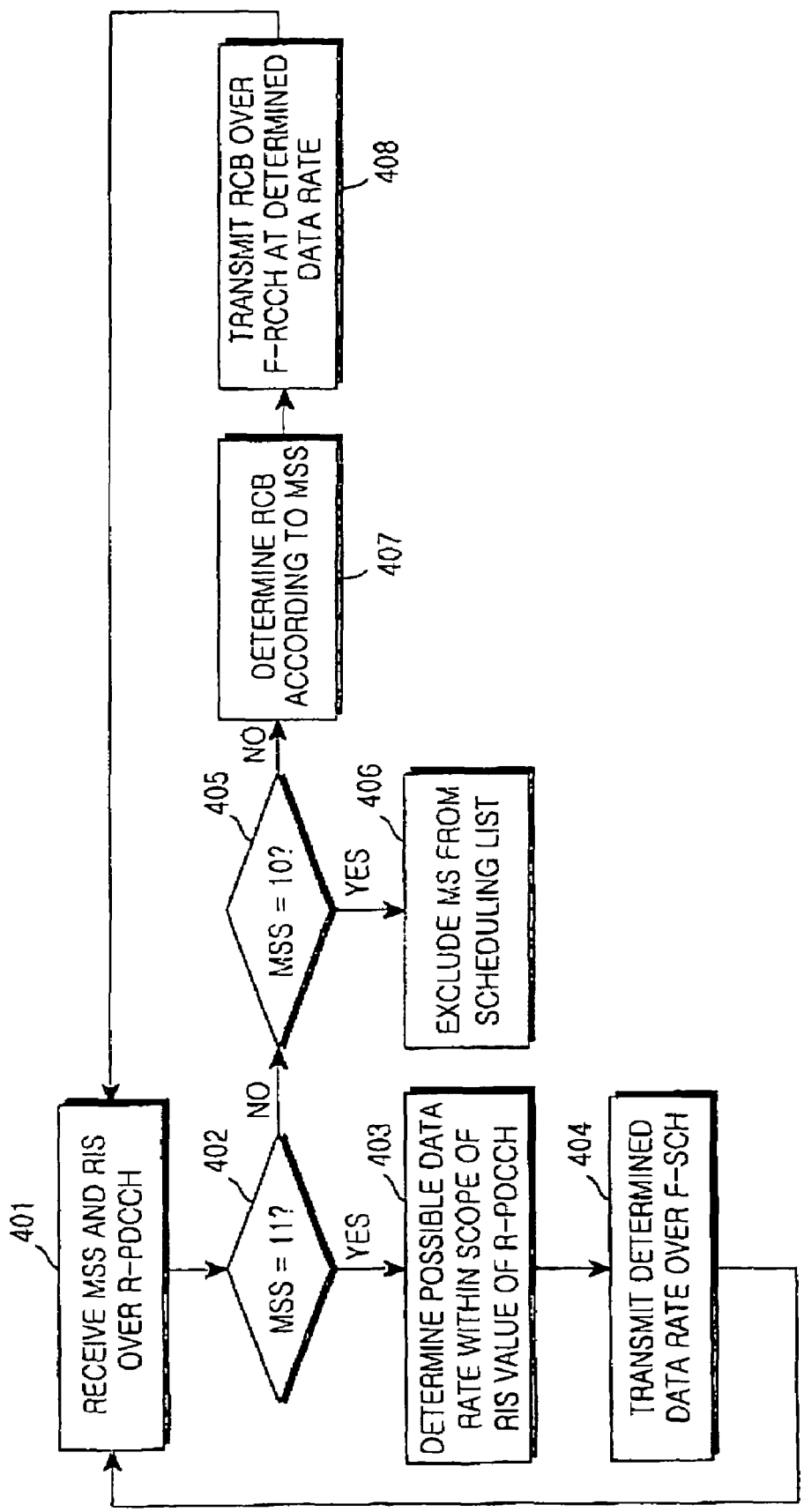
FIG. 4 is a flowchart illustrating a procedure for controlling a reverse data rate by a base station according to the first embodiment of the present invention.

FIG. 4 is a flowchart illustrating a procedure for controlling a reverse data rate by a base station according to the first embodiment of the present invention. In step 401, a base station receives MSS and RIS information indicating a status of a mobile station over an R-PDCCH from all mobile stations therein, and demodulates the received MSS and RIS for analysis. Thereafter, in step 402, the base station determines whether the demodulated MSS field value is '11'. If it is determined in step 402 that the MSS field value is '11' (MSS=11), the base station proceeds to step 403, where it analyzes the RIS field value included in the R-PDCCH received from the mobile station that transmitted the MSS=11. Further, in step 403, the base station determines a reverse rate of the mobile station within the scope of the rate included in the RIS field. That is, the base station regards the RIS field value as a possible maximum rate of the mobile station. In addition, the base station determines a reverse rate of the mobile station within the scope of the possible maximum rate of the mobile station taking the total reverse RoT or load into account.

Thereafter, in step 404, the base station transmits information on the determined forward rate to the mobile station over the F-SCH. The F-SCH, as described above, includes a MAC ID relating the mobile station and the determined rate information. Accordingly, the base station can always increase or decrease a data rate of a particular mobile station by at least two steps through the F-SCH.

However, if it is determined in step 402 that MSS is not '11', in step 405, the base station determines whether the MSS value is '10'. If it is determined in step 405 that the MSS value is '10', the base station proceeds to step 406. In step 406, the base station determines that there is no more transmission data in the buffer of the mobile station. Therefore, the base station excludes the mobile station from a list of mobile stations to be scheduled. Then the mobile station does not perform reverse data transmission any longer. That is, when reverse transmission is suspended, the base station timely excludes the corresponding mobile station from the scheduling list, thereby increasing throughput of the entire system.

If it is determined in step 405 that the MSS value is not '10', the base station proceeds to step 407. That is, when it is determined in step 405 that the MSS value is not '10', the MSS value is '00' or '01'. In step 407, the base station regards the RIS as information on a current data rate of the mobile station. Further, the base station determines whether to increase or decrease the data rate of the mobile station by one step or maintain the current data rate, according to the MSS and RIS. That is, the base station determines an RCB value for the mobile station. Thereafter, in step 408, the base station transmits the determined RCB value over the F-RCCH. The process of steps 407 and 408 is identical in operation to the corresponding process described in the Related Art section.

Figure 5:
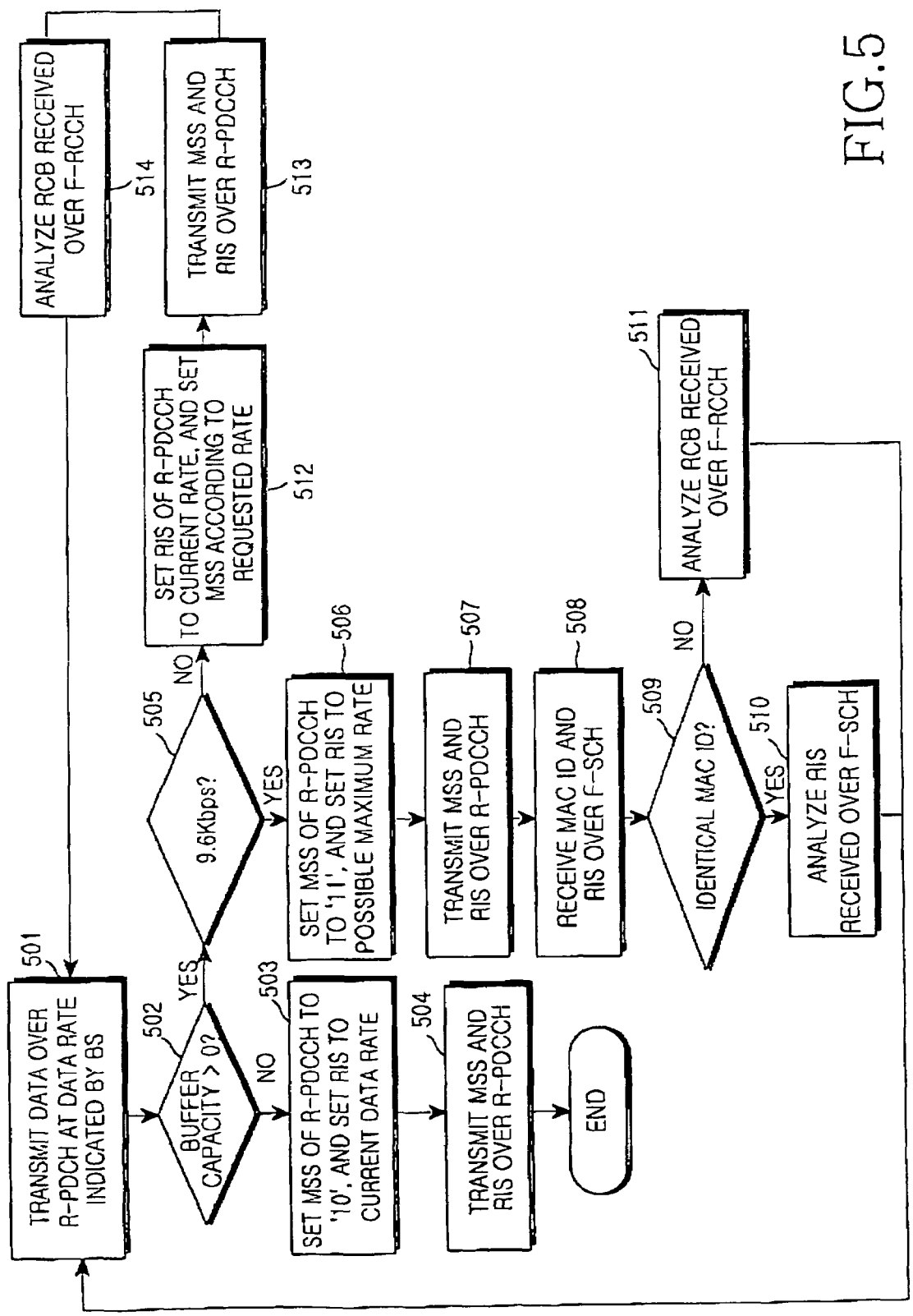
FIG. 5 is a flowchart illustrating a procedure for determining a reverse rate by a mobile station according to the first embodiment of the present invention.

FIG. 5 is a flowchart illustrating a procedure for determining a reverse rate by a mobile station according to the first embodiment of the present invention. In step 501, a mobile station generates packet data at a data rate indicated by a base station and transmits the packet data over the R-PDCH. When the reverse transmission is initial transmission, a reverse rate of the mobile station becomes 9.6 Kbps as assumed above. However, when the reverse transmission is not initial transmission, the reverse rate of the mobile station becomes a rate set by the base station. After transmitting reverse packet data, in step 502, the mobile station determines whether there is transmission data left in its buffer. If it is determined in step 502 that there is no transmission data in the buffer, the mobile station proceeds to step 503. Otherwise, the mobile station proceeds to step 505.

If there is no transmission data in the buffer, the mobile station proceeds to step 503 where it sets MSS to '10' and sets an RIS value to its current data rate. Thereafter, the mobile station proceeds to step 504 where it transmits the MSS and the RIS over the R-PDCCH. That is, the process stated above is provided to exclude the mobile station from the next scheduling.

However, if it is determined in step 502 that there is transmission data left in the buffer, the mobile station proceeds to step 505 where it determines whether a rate of the next reverse transmission packet data is 9.6 Kbps. If it is determined in step 505 that a rate of the packet data to be transmitted over the R-PDCH is 9.6 Kbps, the mobile station proceeds to step 506. However, if it is determined in step 505 that a rate of the packet data to be transmitted over the R-PDCH is not 9.6 Kbps, the mobile station proceeds to step 512.

In step 506, the mobile station sets an MSS value of the R-PDCCH to '11 and sets an RIS value to a possible maximum rate available at the next transmission time. Thereafter, in step 507, the mobile station transmits the determined MSS and RIS over R-PDCCH. In this case, the R-PDCCH can be transmitted together with R-PDCH as illustrated in FIGS. 2 and 3. The R-PDCCH and the R-PDCH can be transmitted at the same time or different times. Accordingly, the transmission times of the R-PDCCH and the R-PDCH are changeable according to systems. However, the present invention can also be applied even when transmission times of the R-PDCCH and the R-PDCH are different from each other.

After transmitting the MSS value and the RIS value over the R-PDCCH in step 507, the mobile station proceeds to step 508 where it analyzes the F-SCH transmitted from the base station. The F-SCH, as described above, includes a MAC ID and an RIS. Therefore, the mobile station determines in step 509 whether the MAC ID included in the received F-SCH is identical to its own MAC ID. If the MAC ID included in the F-SCH is identical to its own MAC ID, the mobile station proceeds to step 510. If the MAC ID included in the F-SCH is not identical to its own MAC ID, the mobile station proceeds to step 511.

In step 510, the mobile station analyzes an RIS value received over the F-SCH and then determines a reverse rate at the next transmission time. However, if the two MAC IDs are different from each other, the mobile station proceeds to step 511 where it analyzes an RCB value received over the F-RCCH and then determines a reverse rate at the next transmission time according to the received RCB value. That is, the mobile station analyzes the RCB value according to the Limited Rate Transition scheme, and increases/decreases the current rate by one step or maintains the current rate.

If it is determined in step 505 that the rate of R-PDCH is not 9.6 Kbps, in step 512, the mobile station sets an RIS value to a current data rate and sets an MSS values according to whether the mobile station can further increase the current data rate. Thereafter, in step 513, the mobile station transmits the set MSS and RIS over the R-PDCCH. In step 514, the mobile station receives the RCB over the F-RCCH, analyzes the received RCB, determines whether to increase/decrease the current data rate by one step or maintain the current data rate according to the RCB command, and then returns to step 501 to transmit data.

In the procedure illustrated in FIG. 5, it is important that the mobile station receives both the F-RCCH and the F-SCH. The mobile station first receives the F-SCH out of the two channels, and does not use information received over the F-RCCH, if information transmitted over the F-SCH is identical to its own information. However, if information transmitted over the F-SCH is not identical to its own information, the mobile station determines its reverse rate using information received over the F-RCCH. Although this embodiment sets an MSS value to '11' only when a current rate of the mobile station is 9.6 Kbps, the embodiment can also be applied even when the current rate is not 9.6 Kbps.

Figure 6:
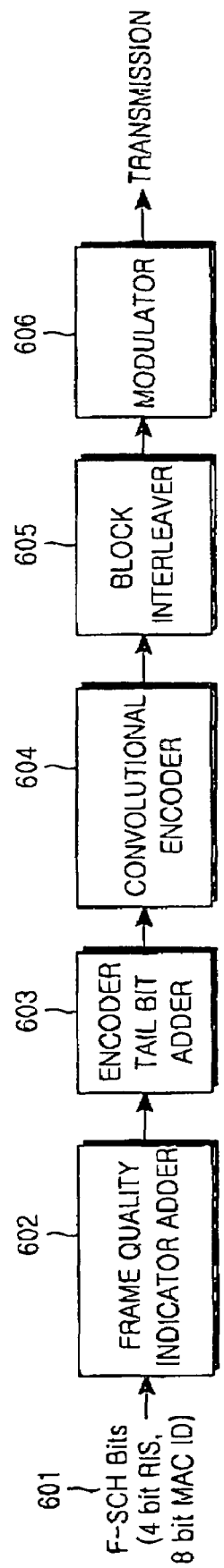
FIG. 6 is a block diagram illustrating an F-SCH transmitter in a base station for controlling a reverse rate according to the first embodiment of the present invention.

FIG. 6 is a block diagram illustrating an F-SCH transmitter in a base station for controlling a reverse rate according to the first embodiment of the present invention. The F-SCH transmitter illustrated in FIG. 6 is identical in structure to a general transmitter using a convolutional encoder. As illustrated, the F-SCH transmitter includes a frame quality indicator adder 602, an encoder tail bit adder 603, a convolutional encoder 604, a block interleaver 605, and a modulator 605. Other elements of the F-SCH transmitter are not illustrated in FIG. 6.

It is assumed that information on the F-SCH input to the F-SCH transmitter has a 4-bit RIS and an 8-bit MAC ID. It should be noted that the number of RIS bits and MAC ID bits is changeable according to systems. Such information to be transmitted over the F-SCH is input to the frame quality indicator adder 602. The frame quality indicator adder 602 adds an error detection code such as a cyclic redundancy code (CRC) to the information including the RIS and the MAC ID. Information output from the frame quality indicator adder 602 is input to the encoder tail bit adder 603. The encoder tail bit adder 603 adds predetermined tail bits to the information output from the frame quality indicator adder 602 so that the information should be converged into a particular state. Thereafter, the tail bit-added information is input to the convolutional encoder 604 where it is convolutionally-encoded. The convolutionally-encoded information is block-interleaved by the block interleaver 605. Thereafter, the block-interleaved information is modulated by the modulator 606 and then transmitted over the F-SCH.

Figure 7:
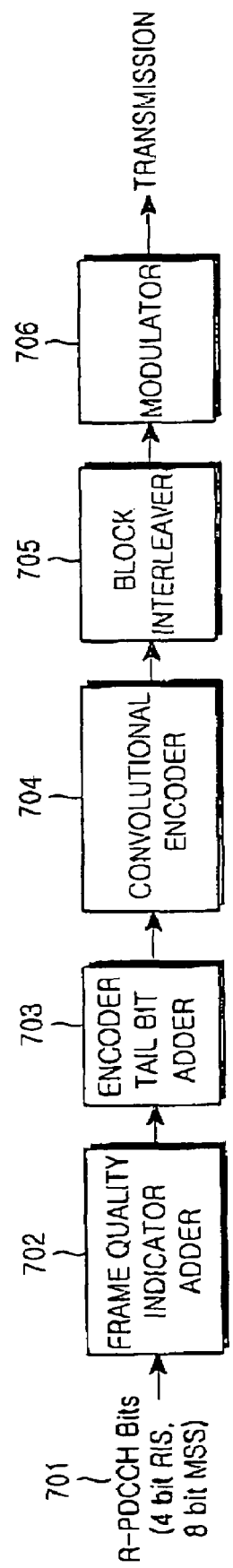
FIG. 7 is a block diagram of an R-PDCCH transmitter in a mobile station according to the first embodiment of the present invention.

FIG. 7 is a block diagram of an R-PDCCH transmitter in a mobile station according to the first embodiment of the present invention. The R-PDCCH transmitter illustrated in FIG. 7 is similar in structure to the F-SCH transmitter illustrated in FIG. 6 except for the information input thereto. That is, reverse transmission information has 4-bit RIS information and 2-bit MSS information. Such information is constructed in the process described above.

In operation, the information is input to a frame quality indicator adder 702. The frame quality indicator adder 702 adds a CRC for error detection to the input information, and an encoder tail bit adder 703 adds tail bits to the CRC-added information. Thereafter, a convolutional encoder 704 channel-encodes the tail bit-added information, and a block interleaver 705 block-interleaves the channel-encoded information. The interleaved information is modulated by a modulator 706 and then transmitted to a base station over the R-PDCCH.

Second Embodiment

A second embodiment of the present invention provides a method for solving a defect of the Limited Rate Transition scheme described in the Related Art section. The Limited Rate Transition scheme is applied, for example, to a system defined by the 3GPP2 C.S0024 (also known as HDR or 1xEV-DO), and can also be applied to a similar data transmission system through a slight modification.

In the following description of the second embodiment, Table 3 used in the first embodiment is not used. Instead, the information shown in Table 2 described in the Related Art section is used.

Figure 8:
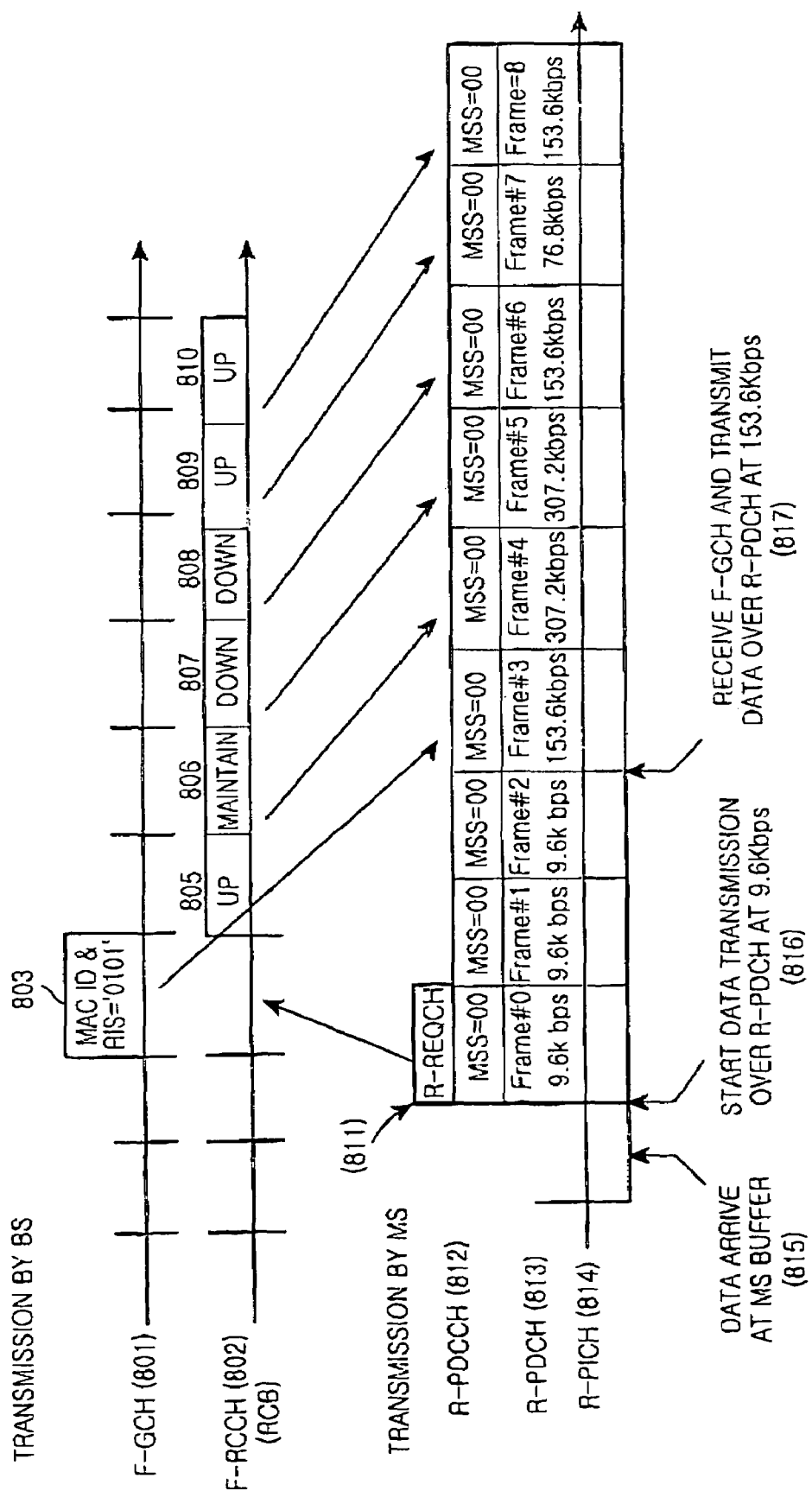
FIG. 8 is a timing diagram illustrating a procedure for controlling a data rate of a mobile station according to a second embodiment of the present invention.

FIG. 8 is a timing diagram illustrating a procedure for controlling a data rate of a mobile station according to the second embodiment of the present invention. Referring to FIG. 8, forward channels transmitted from a base station to a mobile station include a forward grant channel (F-GCH) 801 and a forward rate control channel (F-RCCH) 802, and reverse channels transmitted from the mobile station to the base station include R-PDCCH 812, R-PDCH 813, a reverse request channel (R-REQCH) 811, and a reverse pilot channel (R-PICH) 814. Compared with the first embodiment, the second embodiment includes the additional channels of F-GCH 801 and R-REQCH 811. The additional channels are provided to transmit information necessary for supporting a Rate Jump-Up and a Rate Jump-Down, which are rate control operations of a mobile station according to the present invention. The Rate Jump-Up and Jump-Down will be described below.

Names and structures of the additional channels used herein according to the second embodiment of the present invention are given by way of example. Therefore, names of the additional channels are changeable according to the type of information necessary for supporting Rate Jump-Up and Jump-Down, and a method for controlling the information. Of the information necessary for supporting Rate Jump-Up and Jump Down, information transmitted from the mobile station to the base station can include a possible maximum data rate in terms of a power status or transmission power of the mobile station, and the amount of data stored in a buffer of the mobile station. Such information enables the base station to allow the mobile station to jump up or jump down its data rate in a scheduling process.

Of the information necessary for supporting Rate Jump-Up and Jump Down, information transmitted from the base station to the mobile station should include a mobile station identifier, e.g., a MAC ID, for indicating which mobile station's data rate it controls. Further, the information transmitted from the base station to the mobile station includes data rate information relating how far a reverse data rate of the mobile station it will jump up or jump down. Such information is transmitted over the F-GCH 801 proposed in the present invention. The base station receives from the mobile station information on a possible maximum data rate of the mobile station in terms of a power status or transmission power of the mobile station, and information on the amount of data stored in a buffer of the mobile station, and uses the received information for scheduling on the mobile station.

As described above, the F-GCH 801 is used by a base station to indicate a reverse data rate of a mobile station, and a detailed description of use and operation thereof will be made below. The R-REQCH 811 is a channel for transmitting information to be transmitted to a base station in order to allow a mobile station to jump up its data rate according to an embodiment of the present invention. Use and operation of the R-REQCH 811 will be described in detail herein below. When data enters its buffer, the mobile station attempts data transmission at an autonomous data rate, a data rate at which the mobile station is allowed to transmit data without base station's control, and transmits information indicating Rate Jump-Up over the R-PDCCH 812 as well as a packet data channel.

The information indicating a Rate Jump-Up, i.e., information indicating a status of a mobile station, transmitted to a base station over the R-PDCCH 812, is an MSS and an RIS. In addition, the mobile station transmits the R-REQCH 811 in order to inform the base station of such information as a power status thereof and the amount of transmission data stored in its buffer. The R-REQCH 811 can be transmitted periodically, or transmitted only when new data enters in the buffer.

Upon receiving the R-PDCCH 812 and the R-REQCH 811, a scheduler of the base station determines a data rate of the mobile station. The base station transmits an RIS and an RCB, i.e., the determined data rate information, to the mobile station over F-RCCH 802 and F-GCH 801, respectively.

The F-GCH 801 is a channel transmitted to a mobile station by a base station, and information transmitted over the F-GCH 801 includes the MAC ID and the RIS, which is scheduled data rate information for the mobile station. A mobile station desiring to perform reverse transmission receives the MAC ID information from the base station in an initial environment setup or call setup process. The scheduled data rate information for a mobile station is transmitted in the manner shown in Table 1. The F-GCH 801 can be used as a channel for transmitting scheduling result for mobile stations that transmitted R-REQCH 811. Accordingly, the mobile stations continuously monitor the F-GCH 801. If the MAC ID and the RIS for a particular mobile station are received over the F-GCH 801, the mobile station determines that the base station has granted the mobile station a data rate indicated by the RIS. Then the mobile station transmits data at a reverse data rate jumped up or down by two or more steps according to a data rate corresponding to the RIS field.

In FIG. 8, data arrives at a buffer of a mobile station at a time 815. The mobile station starts transmitting data stored in the buffer from a next transmission unit boundary nearest to the time 815. That is, the mobile station starts reverse data transmission at a time 816. For example, in the system illustrated in FIG. 8, all mobile stations are allowed to transmit low-rate data of 9.6 Kbps without base station's control. Here, it is assumed that the amount of data arrived at the buffer of the mobile station at the time 815 is sufficiently large and transmission power of the mobile station at the time where data transmission is started at the rate of 9.6 Kbps is sufficiently lower than the maximum transmission power limit of the mobile station. At the time 816, the mobile station transmits such information as a power status of the mobile station and the amount of data stored in the buffer of the mobile station, over the R-REQCH 811.

A data rate at the time where Frame#0 is transmitted, i.e., a data rate at which the mobile station transmits data at the time 816, is 9.6 Kbps. Therefore, an RIS field value of the R-PDCCH 812 becomes '0001', indicating that a data rate of the mobile station is 9.6 Kbps as shown in Table 1. Further, the mobile station transmits information on a power status and buffer capacity thereof over R-REQCH 811.

A scheduler of the base station, receiving the R-PDCCH 812 transmitted in the reverse direction for a period of Frame#0, analyzes the RIS, the MSS, the buffer capacity, and the power status of a corresponding mobile station, and then determines which data rate it will assign to the corresponding mobile station, taking RoT or a reverse load of the base station into consideration. If a data rate of the mobile station, determined by the scheduler, is 19.2 Kbps, which is one step higher than 9.6 Kbps, the base station transmits RCB to the mobile station over F-RCCH 802. The RCB can include information for instructing the mobile station to increase its data rate by one step or maintain its data rate at the next frame.

However, if a data rate of the mobile station, determined by the scheduler, is higher than 19.2 Kbps, the base station transmits information indicating a particular rate to the mobile station over F-GCH 801. As stated above, the information transmitted over F-GCH 801 includes MAC ID and RIS. For example, in FIG. 8, the scheduling result indicates a data rate of 307.2 Kbps. Therefore, an RIS field value of F-GCH 801 becomes '0101', as denoted by reference numeral 803.

The mobile station receiving the F-GCH 801 first analyzes a MAC ID field 803 in the received F-GCH 801. If the MAC ID field value 803 is identical to its own MAC ID, the mobile station determines that the RIS field value of the F-GCH 801 indicates a data rate assigned thereto. Therefore, the mobile station transmits data at 153.6 Kbps over R-PDCH 813 from a time 817.

After increasing the rate to a high rate, the mobile station sets an a RIS field value of R-PDCCH 812 to '0101', indicating 307.2 Kbps, and sets an MSS field to one of the values shown in Table 2. Therefore, the MSS field is set to any one of '00', '01', and '10' according to a rate requested by the mobile station. The succeeding operations of the mobile station and the base station are performed in the existing method described above.

The base station transmits an RCB over the F-RCCH 802 in order to control a data rate of the mobile station on a one-step basis, and the mobile station receives the RCB over F-RCCH 802 and increases/decreases its data rate by one step or maintains its data rate according to the received RCB.

As described above, in the system using the Limited Rate Transition scheme as a scheme for controlling a data rate of a mobile station, the present invention provides a method for controlling the data rate of the mobile station on a one-step basis and/or jumping up/down the data rate of the mobile station by several steps.

As described in connection with FIG. 8, a data rate of a mobile station can be jumped up from 9.6 Kbps by several steps at once, and can also be increased on a one-step basis. Therefore, compared with the conventional method in which the data rate is increased by only step, the new method can reduce a time required when a data rate reaches a high data rate, thereby contributing to improvement in throughput of a mobile station and throughput of the entire system.

Figure 9:
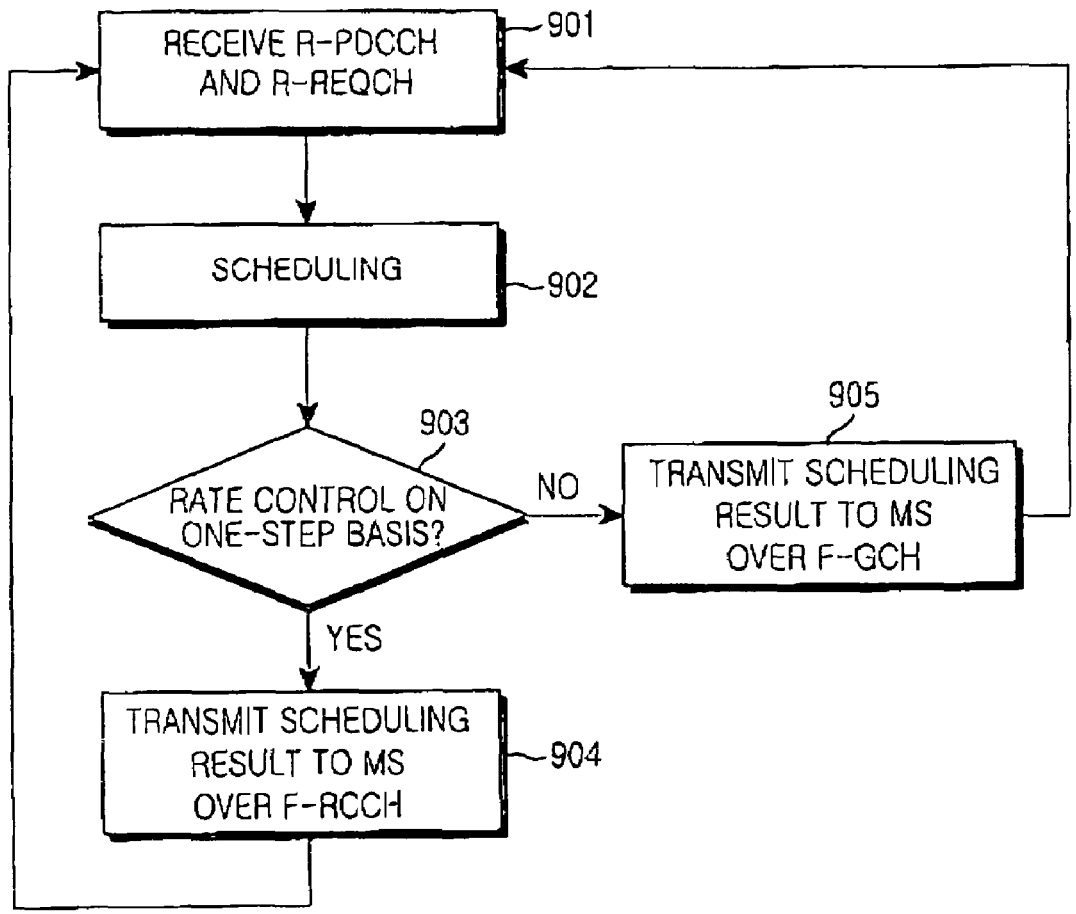
FIG. 9 is a flowchart illustrating a procedure for controlling a reverse rate by a base station according to the second embodiment of the present invention.

FIG. 9 is a flowchart illustrating a procedure for controlling a reverse rate by a base station according to the second embodiment of the present invention. In step 901, a base station receives R-PDCCH and R-REQCH from all mobile stations in the system, and demodulates the received R-PDCCH and R-REQCH to detect MSS indicating a status of each mobile station, the RIS, a power status of the mobile station, and a buffer capacity of the mobile station. In step 902, the base station performs scheduling. In the scheduling process, the base station analyzes an MSS field value and determines a reverse rate according to the analysis result. In step 902, the base station performs the scheduling taking status information of each mobile station and capacity information of the base station into consideration. That is, the base station performs the scheduling taking status information of each mobile station and a reverse load or RoT of the base station into account. The scheduling method can be changed according to systems.

In step 903, the base station determines whether the scheduling result in step 902 falls within a one-step up or down from a previous data rate of the mobile station. If the scheduling result falls within one-step up or down from a previous data rate of the mobile station, the base station proceeds to step 904. In step 904, the base station transmits the scheduling result over F-RCCH. That is, the base station transmits 1-bit rate-up/down information to the mobile station.

However, if it is determined in step 903 that the scheduling result falls outside the one-step up/down from a previous data rate of the mobile station, the base station proceeds to step 905, where it transmits the scheduling result to the mobile station over F-GCH. In this case, the scheduling result means that the next rate jumps up or down from the previous rate. In this manner, a mobile communication system using the Limited Rate Transition scheme can also rapidly change a data rate.

Figure 10:
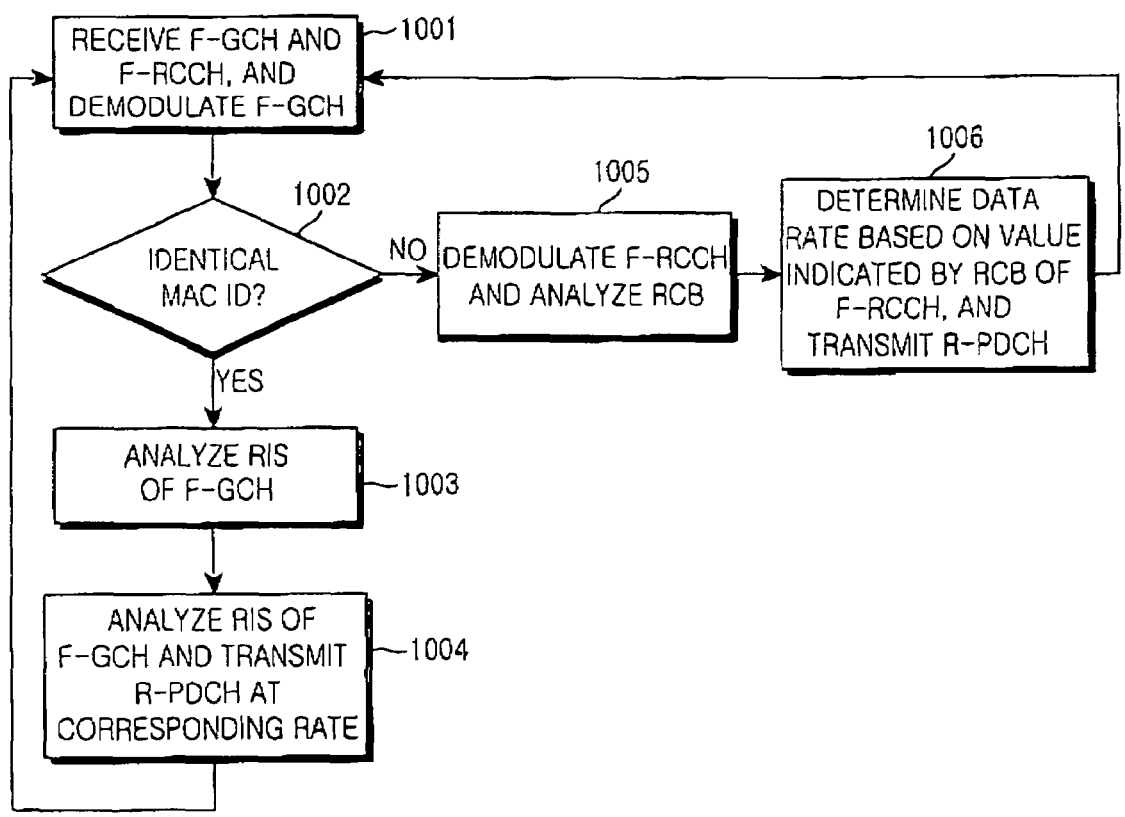
FIG. 10 is a flowchart illustrating a procedure for controlling a reverse data rate by a mobile station according to the second embodiment of the present invention.

FIG. 10 is a flowchart illustrating a procedure for controlling a reverse data rate by a mobile station according to the second embodiment of the present invention. In step 1001, a mobile station receives F-GCH and F-RCCH, and then demodulates the received F-GCH. In step 1002, the mobile station analyzes the MAC ID in the demodulated F-GCH and determines whether the MAC ID of a message received over the F-GCH is identical to its own MAC ID. That is, the mobile station determines whether the F-GCH has been transmitted to the mobile station itself. If the analyzed MAC ID is identical to its own MAC ID, the mobile station proceeds to step 1003. However, if the analyzed MAC ID is not identical to its own MAC ID, the mobile station proceeds to step 1005. In step 1003, the mobile station analyzes an RIS field value of the F-GCH. In step 1004, the mobile station transmits R-PDCH at a data rate corresponding to the analyzed RIS field value.

In step 1005, the mobile station demodulates a message received over the F-RCCH and analyzes an RCB in the demodulated message. Thereafter, in step 1006, the mobile station increases/decreases a rate of R-PDCH by one step or maintains the rate of R-PDCH, according to a value of the RCB.

As described in connection with FIG. 10, the mobile station receives both the F-GCH and the F-RCCH. The mobile station first analyzes the F-GCH, and determines a reverse data rate according to the F-GCH, if it is determined that the F-GCH has been transmitted to the mobile station itself. However, if it is determined that the F-GCH has not been transmitted to the mobile station itself, the mobile station determines its reverse data rate according to the F-RCCH.

In an example of FIG. 10, reception times of the F-GCH and the F-RCCH have not been mentioned because the reception times are changeable according to systems. In step 1001 of FIG. 10, the mobile station receives both the F-GCH and the F-RCCH, because both of the two channel signals are required in describing the present invention. That is, the two channel signals can be received at different times. In this case, the F-GCH and the F-RCCH are separately received, and a reverse data rate can be determined according thereto in the method described in connection with FIG. 10.

In the second embodiment, the F-GCH transmitter is identical in structure to the F-SCH transmitter illustrated in FIG. 6 described in conjunction with the first embodiment of the present invention. Therefore, a description of the F-GCH transmitter will not be provided herein. Also, the R-REQCH transmitter is identical in structure to the R-PDCCH transmitter illustrated in FIG. 7 described in conjunction with the first embodiment of the present invention.

Figure 11:
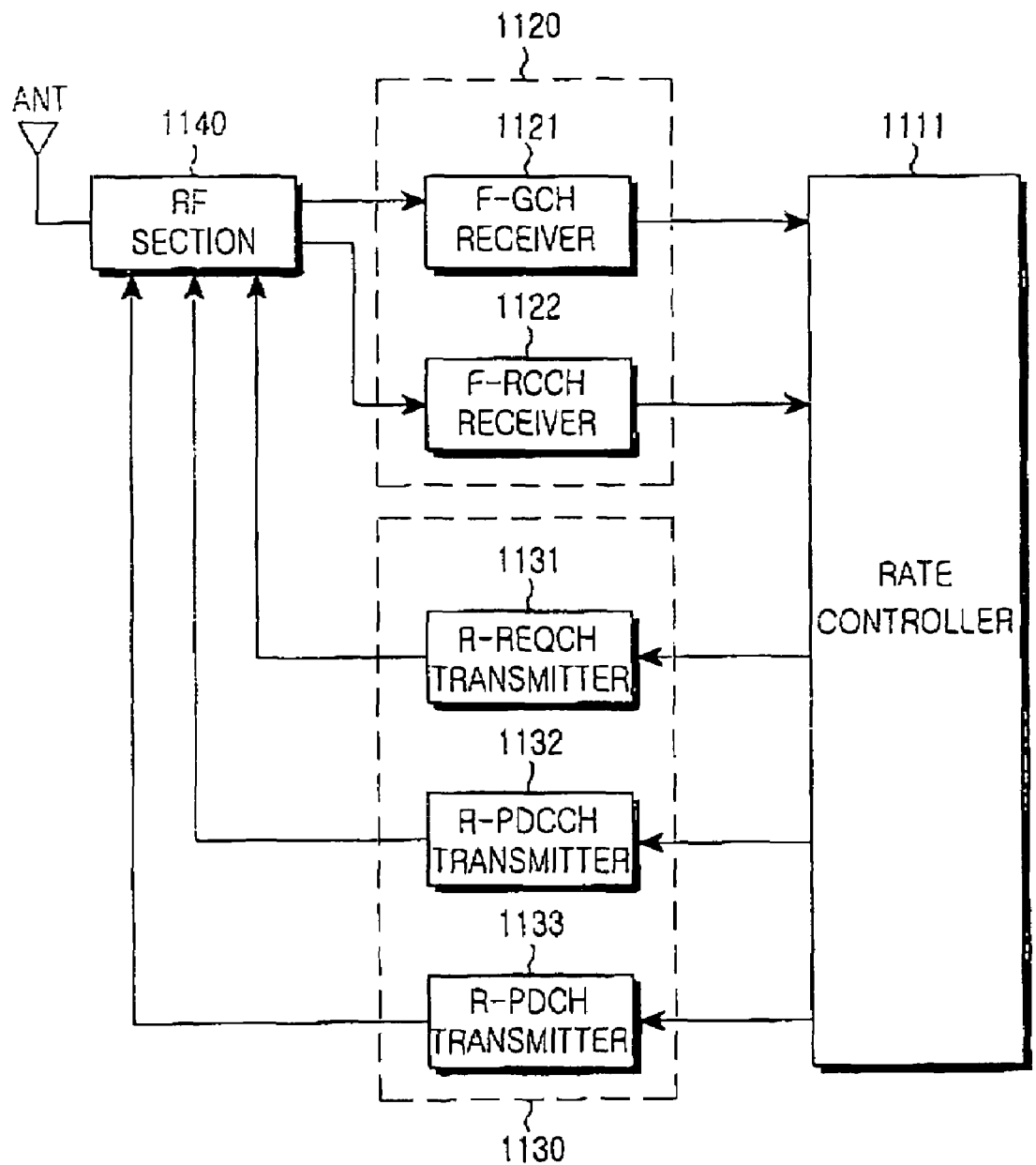
FIG. 11 is a block diagram of a mobile station for determining a rate of reverse packet data according to an embodiment of the present invention.

FIG. 11 is a block diagram of a mobile station for determining a rate of reverse packet data according to an embodiment of the present invention. For simplicity, FIG. 11 illustrates only a block diagram for determining a rate of reverse packet data according to an embodiment of the present invention.

Referring to FIG. 11, a forward radio signal received from a base station is input to a radio frequency (RF) section 1140 via an antenna ANT, and the RF section 1140 converts the radio signal into a baseband signal. A rate-related signal in the converted baseband signal is input to a rate receiver 1120. The rate receiver 1120 includes a forward grant channel (F-GCH) receiver 1121 and a forward rate control channel (F-RCCH) receiver 1122. The F-GCH receiver 1121 extracts identifier information (MAC ID) of a mobile station and rate information from information received over a forward rate control channel, and provides the extracted information to a rate controller 1111. The F-RCCH receiver 1122 receives reverse rate change information. The reverse rate change information can indicate an increase of one step, a hold, or a decrease of one step, or indicate an increase of one step or a decrease of one step.

The rate controller 1111 analyzes the identifier information (MAC ID) of a mobile station in the information received from the F-GCH receiver 1121, and determines whether the received identifier information is identical to its own identifier information. If it is determined that the received identifier information is identical to its own identifier information, the rate controller 1111 changes a current rate based on the rate information received from the F-GCH receiver 1121. However, if it is determined that the received identifier information is not identical to its own identifier information, the rate controller 1111 selects the rate change information received from the F-RCCH receiver 1122, and changes the current rate based on the selected rate change information. That is, if the current rate is one of the rates shown in Table 1, the rate controller 1111 increases or decreases the current rate by one step, or maintains it.

After changing the rate information, the rate controller 1111 generates a rate request value considering its possible reverse transmission power and the amount of data stored in a buffer (not shown). Further, the rate controller 1111 sets a new rate determined based on the current rate information, i.e., the information received from the rate receiver 1120, to an RIS value shown in Table 1, and outputs the data stored in the buffer at the new rate.

The information output from the rate controller 1111 is input to a rate and data transmitter 1130. The rate and data transmitter 1130 includes a reverse request channel (R-REQCH) transmitter 1131 for transmitting a rate request value, a reverse packet data channel (R-PDCH) transmitter 1133 for transmitting reverse packet data, and a reverse packet data control channel (R-PDCCH) transmitter 1132 for transmitting reverse packet data control information and RSS information which is reverse rate-up/down request information.

Figure 12:
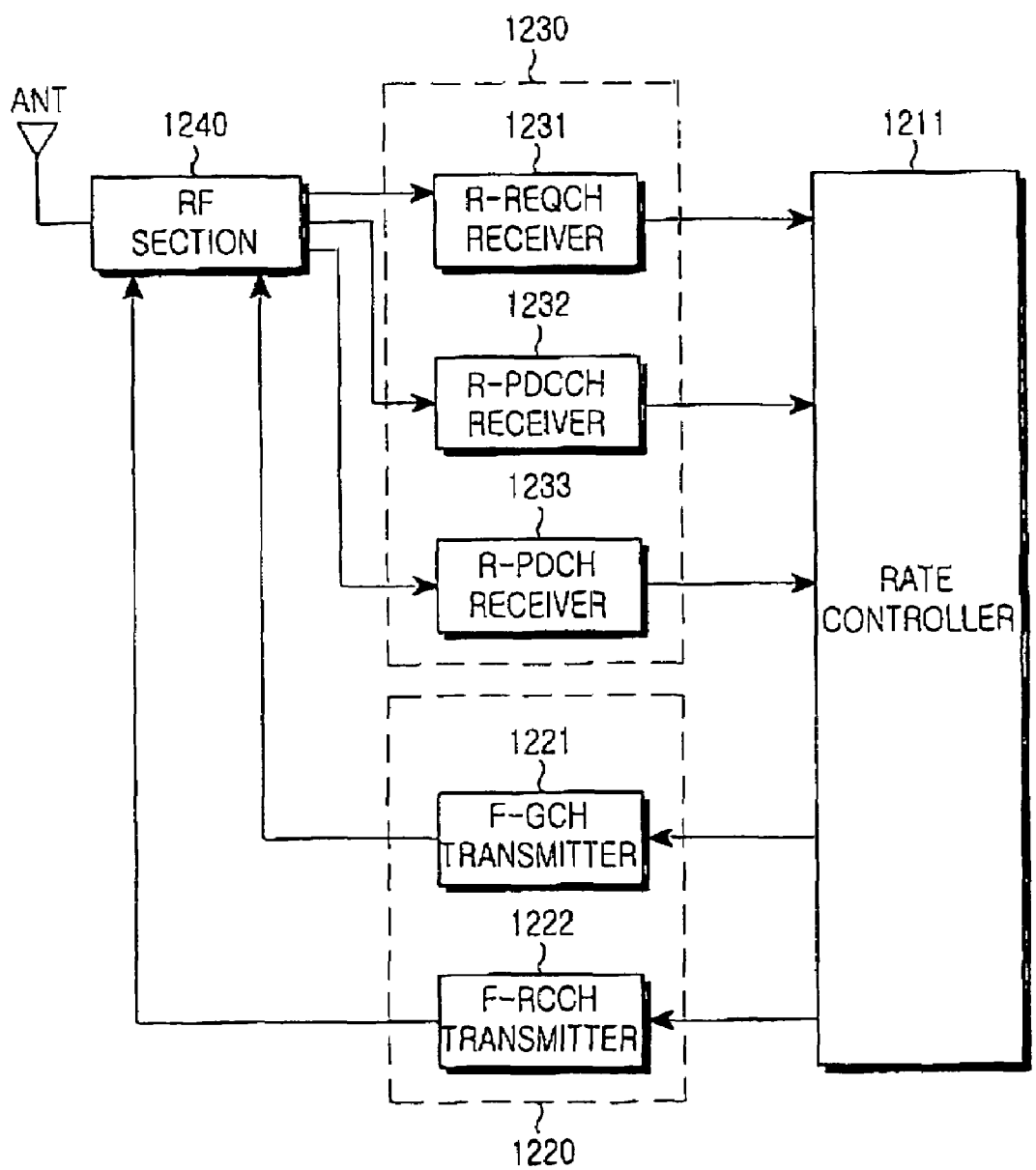
FIG. 12 is a block diagram of a base station for determining a rate of reverse packet data according to an embodiment of the present invention.

FIG. 12 is a block diagram of a base station for determining a rate of reverse packet data according to an embodiment of the present invention. For simplicity, FIG. 12 illustrates only a block diagram for determining a rate of reverse packet data according to an embodiment of the present invention.

Referring to FIG. 12, a reverse radio signal received from a mobile station is input to a radio frequency (RF) section 1240 via an antenna ANT, and the RF section 1240 converts the radio signal into a baseband signal. The converted baseband signal is input to a rate request information and packet data receiver 1230. The rate request information and packet data receiver 1230 includes a reverse request channel (R-REQCH) receiver 1231, a reverse packet data control channel (R-PDCCH) receiver 1232, and a reverse packet data channel (R-PDCH) receiver 1233. The receivers 1231, 1232, and 1233 receive the information transmitted by the transmitters 1131, 1132, and 1133 of FIG. 11, respectively. The received information is input to a rate controller 1211 included in the base station.

The rate controller 1211 receives the information, and determines a rate of a mobile station using a requested rate and a reverse load or RoT information of the mobile station that transmitted the information. If the determined rate information indicates an increase/decrease of one step or a hold from a current rate of the mobile station, the rate controller 1211 transmits rate change information to a forward rate control channel (F-RCCH) transmitter 1222 in a forward rate transmitter 1220.

However, if the determined rate information indicates an increase/decrease of at least two steps from the current rate, the rate controller 1211 controls a forward grant channel (F-GCH) transmitter 1221 in the rate transmitter 1220 to transmit identifier information (MAC ID) of the mobile station and rate information of the mobile station together.

As is understood from the foregoing description, the mobile station in the present invention rapidly transmits data at a desired high data rate, thereby improving the reverse throughput of an entire system.

While the present invention has been shown and described with reference to a certain preferred embodiment thereof, it will be understood by those skilled in the art that various changes in form and details may be made therein without departing from the spirit and scope of the present invention as defined by the appended claims.

What is claimed is:

1. A method for determining a data rate of reverse packet data by a mobile station, in a mobile communication system for transmitting the reverse packet data from the mobile station to a base station, the method comprising the steps of:

receiving information related to a data rate and identifier information of the mobile station, transmitted from the base station over a first channel;

receiving data rate change information from the base station over a second channel;

if the identifier information received over the first channel is identical to identifier information of the mobile station, transmitting the reverse packet data using the information related to the data rate received over the first channel; and if the identifier information received over the first channel is not identical to the identifier information of the mobile station, transmitting the reverse packet data at a data rate determined based on the data rate change information.

2. The method of claim 1, wherein the data rate change information includes information related to one of an increase of one step, a hold, and a decrease of one step, from the data rate of previous reverse packet data channel.

3. The method of claim 1, wherein the first channel is a forward scheduling channel (F-SCH).

4. The method of claim 1, wherein the first channel is a forward grant channel (F-GCH).

5. The method of claim 1, wherein the second channel is a forward common rate control channel (F-RCCH).

6. The method of claim 1, wherein the identifier information is a medium access control identifier (MAC ID).

7. The method of claim 1, further comprising the step of transmitting information related to a presence of transmission packet data over a reverse request channel (R-REQCH) of a reverse traffic channel if there is transmission packet data.

8. The method of claim 1, further comprising the step of transmitting status information of the mobile station over a reverse packet data control channel (R-PDCCH).

9. An apparatus configured to determine a data rate of reverse packet data for a mobile station in a mobile communication system for transmitting the reverse packet data from the mobile station to a base station, the apparatus comprising:
a first channel receiver for receiving information related to a data rate and identifier information of the mobile station, transmitted from the base station over a first channel;
a second channel receiver for receiving data rate change information from the base station over a second channel; and
a rate controller for transmitting the reverse packet data using the information related to the data rate, if the identifier information received over the first channel is identical to unique identifier information of the mobile station, and transmitting the reverse packet data at a data rate determined based on the data rate change information received over the second channel, if the identifier information received over the first channel is not identical to the unique identifier information of the mobile station.

10. The apparatus of claim 9, wherein the data rate change information is information related to one of an increase of one step, a hold, and a decrease of one step, from a data rate of previous reverse packet data.

11. The apparatus of claim 9, wherein the first channel is a forward grant channel (F-GCH).

12. The apparatus of claim 9, wherein the second channel is a forward common rate control (F-RCCH).

13. The apparatus of claim 9, wherein the identifier information is a medium access control identifier (MAC ID).

14. The apparatus of claim 9, further comprising a transmitter for transmitting data rate request information for a reverse traffic channel when there is transmission packet data.

15. The apparatus of claim 9, further comprising a transmitter for transmitting status information of the mobile station.

16. A method for controlling data rates of a reverse packet data channel by a mobile station in a mobile communication system for transmitting reverse packet data over the reverse packet data channel at one of a plurality of data rates, the method comprising the steps of:
receiving scheduled data rate information and identifier information of the mobile station from a base station over a first channel;
receiving step-by-step data rate information related to a change in a data rate from a data rate of a previous reverse packet data channel, from the base station over a second channel;
if the identifier information is identical to identifier information of the mobile station, transmitting reverse packet data at the scheduled data rate received over the first channel; and
if the identifier information is not identical to identifier information of the mobile station, transmitting reverse packet data at a data rate determined based on the step-by-step data rate information received over the second channel.

17. The method of claim 16, further comprising the steps of:
if there is data to be transmitted at a next transmission time, determining a maximum data rate according to transmission power assignable to the reverse packet data channel and an amount of data that can be transmitted over the reverse packet data channel; and
transmitting the determined maximum data rate and a scheduling request message over a first reverse channel together with the packet data channel.

18. The method of claim 16, wherein the step-by-step data rate information includes information related to one of an increase of one step, a hold, and a decrease of one step, from the previous reverse packet data rate.

19. The method of claim 16, wherein the first channel is a forward scheduling channel (F-SCH).

20. The method of claim 16, wherein the first channel is a forward grant channel (F-GCH).

21. The method of claim 16, wherein the second channel is a forward common rate control channel (F-RCCH).

22. The method of claim 16, wherein if there is data to be transmitted at a next transmission time, the mobile station determines the possible maximum reverse data rate only when the currently set reverse data rate is a low data rate falling within a predetermined scope, when there is reverse transmission data, and when there is sufficient power to be assigned to a reverse traffic channel, and transmits a scheduling request message over the reverse traffic channel.

23. The method of claim 22, further comprising the steps of:
generating a message for requesting the step-by-step data rate determination when the currently set reverse data rate is not the low data rate falling within the predetermined scope or transmission power to be assigned to the reverse traffic channel is not sufficient; and
transmitting the generated message over the reverse traffic channel.

24. The method of claim 16, further comprising the step of transmitting information related to an absence of data in a buffer over a first reverse channel, if there is no data to be transmitted over a reverse traffic channel at a next transmission time.

25. The method of claim 24, further comprising the step of suspending transmission of reverse traffic starting at a time when the information related to the absence of data in the buffer is transmitted over the first reverse channel.

26. An apparatus for controlling data rates of a reverse packet data channel of a mobile station, by a base station in a mobile communication system for transmitting reverse packet data over the reverse packet data channel at one of a plurality of data rates, the apparatus comprising:
a scheduler for receiving status information of the mobile station from the mobile station, determining a reverse data rate assignable to the mobile station using the status information of the mobile station and channel information assignable to a reverse link; and
a channel transmitter for transmitting information on the reverse data rate determined by the scheduler and identifier information of the mobile station, to the mobile station over a predetermined channel;
wherein the channel transmitter comprises:
a frame quality indicator adder for adding an error correction code to the information on the reverse data rate determined by the scheduler and the identifier information of the mobile station;
a tail bit adder for adding tail bits to the error correction code-added information to converge the error correction code-added information into a particular state;

a convolutional encoder for channel-encoding the tail bit-added information;

a block interleaver for block-interleaving the channel-encoded information; and a modulator for modulating the block-interleaved information.

27. An apparatus for transmitting a data rate request for a reverse packet data channel from a mobile station to a base station, in a mobile communication system for transmitting reverse packet data over the reverse packet data channel at one of a plurality of data rates, the apparatus comprising:

a controller for calculating possible maximum data rate information according to a data rate of a current reverse packet data channel of the mobile station and power capacity of the mobile station, and generating a reverse data rate request message including the calculated data rate information; and a channel transmitter for transmitting the reverse data rate request message generated by the controller over a predetermined reverse channel;

wherein the channel transmitter comprises:

a frame quality indicator adder for adding an error correction code to information on the reverse data rate determined by the controller and identifier information of the mobile station;

a tail bit adder for adding tail bits to the error correction code-added information to converge the error correction code-added information into a particular state;

a convolutional encoder for channel-encoding the tail bit-added information;

a block interleaver for block-interleaving the channel-encoded information; and a modulator for modulating the block-interleaved information.

* * * * *